US008786728B2

(12) United States Patent  (10) Patent No.: US 8,786,728 B2
Ichikawa  (45) Date of Patent: Jul. 22, 2014

(54) IMAGE PROCESSING APPARATUS, IMAGE PROCESSING METHOD, AND STORAGE MEDIUM STORING IMAGE PROCESSING PROGRAM

(75) Inventor: Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 301 days.

(21) Appl. No.: 12/617,065

(22) Filed: Nov. 12, 2009

(65) Prior Publication Data

US 2010/0128142 A1   May 27, 2010

(30) Foreign Application Priority Data

Nov. 21, 2008   (JP) ................... 2008-298462

(51) Int. Cl.
*H04N 9/73*   (2006.01)
(52) U.S. Cl.
USPC ..................................................... 348/223.1
(58) Field of Classification Search
USPC ..................................................... 348/223.1
See application file for complete search history.

(56) References Cited

U.S. PATENT DOCUMENTS

| | | | |
|---|---|---|---|
| 7,502,067 B2 * | 3/2009 | Kakinuma et al. | 348/371 |
| 7,508,421 B2 * | 3/2009 | Tamaru et al. | 348/229.1 |
| 2004/0201728 A1 * | 10/2004 | Tamaru | 348/223.1 |
| 2005/0231524 A1 * | 10/2005 | Fukasawa et al. | 345/590 |
| 2006/0029382 A1 * | 2/2006 | Uchida | 396/166 |
| 2008/0170139 A1 * | 7/2008 | Satodate | 348/243 |
| 2009/0021594 A1 * | 1/2009 | Tsuda et al. | 348/222.1 |

FOREIGN PATENT DOCUMENTS

| | | |
|---|---|---|
| CN | 1514652 | 7/2004 |
| CN | 101090505 | 12/2007 |
| JP | 08-111812 | 4/1996 |
| JP | 2001-112020 | 4/2001 |
| JP | 2004-048663 | 2/2004 |
| JP | 2004-320148 | 11/2004 |
| JP | 2004-348362 | 12/2004 |
| JP | 2006-129263 | 5/2006 |
| JP | 2006-191296 | 7/2006 |
| JP | 2006-295708 | 10/2006 |
| JP | 2007-006021 | 1/2007 |
| WO | WO2006046460 | * 5/2006 |

OTHER PUBLICATIONS

Office Action for Chinese Patent Application No. 200910224613.2, mailed Jun. 22, 2011 (5 pgs.) with translation (5 pgs.).
Office Action for Japanese Patent Application No. 2008-298462, mailed Feb. 19, 2013 (3 pgs.) with translation (4 pgs.).
Office Action from corresponding Japanese Patent Application No. 2008-298462, mailed Dec. 10, 2013 (4 pgs.).

* cited by examiner

*Primary Examiner* — Albert Cutler
(74) *Attorney, Agent, or Firm* — John C. Pokotylo; Straub & Pokotylo

(57) ABSTRACT

An image processing apparatus comprises a white balance setting unit that performs a setting of white balance correction processing on an image data, a white balance correction unit that performs white balance correction processing corresponding to the setting by the white balance setting unit on each of a plurality of RAW image data obtained in a photography operation, and an image synthesizing unit that generates synthesized image data by synthesizing a plurality of image data subjected to the white balance correction processing.

21 Claims, 7 Drawing Sheets

| MODE | R GAIN | B GAIN |
|---|---|---|
| INCANDESCENT LAMP | 1.0 | 2.5 |
| CLEAR SKY | 2.0 | 1.5 |
| CLOUDY SKY | 2.2 | 1.3 |
| SHADOW | 2.5 | 1.0 |

FIG. 7

IMAGE PROCESSING APPARATUS, IMAGE PROCESSING METHOD, AND STORAGE MEDIUM STORING IMAGE PROCESSING PROGRAM

FIELD OF THE INVENTION

This invention relates to a technique for synthesizing a plurality of image data.

BACKGROUND OF THE INVENTION

In recent years, digital cameras having a multiple exposure function for synthesizing a plurality of color-processed color image data to generate an image in which a plurality of scenes appear to be present on a single image have come to be known. JP2004-48663A discloses a technique for realizing image synthesis processing excluding the effects of gamma conversion and so on. In this technique, synthesis is performed after converting color-processed color image data into pre-color processing color image data, whereupon the color processing is implemented anew.

SUMMARY OF THE INVENTION

An image processing apparatus of an aspect of the present invention comprises a white balance setting unit that performs a setting of white balance correction processing on an image data, a white balance correction unit that performs white balance correction processing corresponding to the setting by the white balance setting unit on each of a plurality of RAW image data obtained in a photography operation, and an image synthesizing unit that generates synthesized image data by synthesizing a plurality of image data subjected to the white balance correction processing.

An image processing method of another aspect of the present invention comprises a step of performing a setting of white balance correction processing on an image data, a step of performing white balance correction processing corresponding to the setting on each of a plurality of RAW image data obtained in a photography operation, and a step of generating synthesized image data by synthesizing a plurality of image data subjected to the white balance correction processing.

A storage medium of yet another aspect of the present invention stores an image processing program for causing a computer to execute a step of performing a setting of white balance correction processing on an image data, a step of performing white balance correction processing corresponding to the setting on each of a plurality of RAW image data obtained in a photography operation, and a step of generating synthesized image data by synthesizing a plurality of image data subjected to the white balance correction processing.

BRIEF DESCRIPTION OF THE DRAWINGS

FIG. 7 is a view showing an example of white balance gains corresponding to white balance modes.

DESCRIPTION OF THE PREFERRED EMBODIMENTS

First Embodiment

Figure 1:
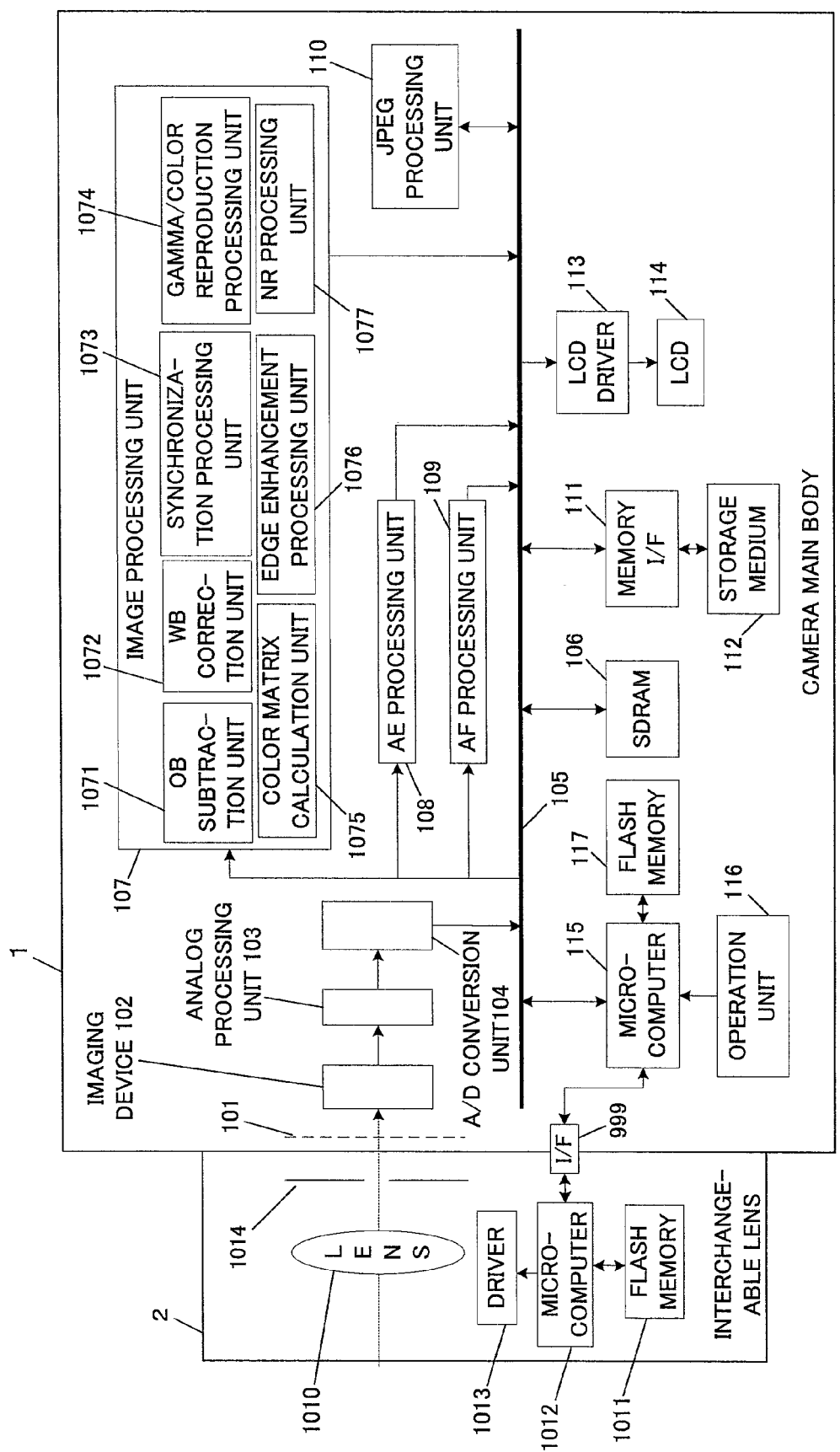
FIG. 1 is a block diagram showing the constitution of a digital still camera to which an image processing apparatus according to a first embodiment is applied.

FIG. 1 is a block diagram showing the constitution of a digital still camera to which an image processing apparatus according to a first embodiment is applied. The digital still camera shown in FIG. 1 comprises a camera main body 1 and an interchangeable lens 2.

The interchangeable lens 2 includes a lens 1010, a flash memory 1011, a microcomputer 1012, a driver 1013, and a diaphragm 1014. The interchangeable lens 2 is connected communicably to the camera main body 1 via an I/F 999.

The camera main body 1 includes a mechanical shutter 101, an imaging device 102, an analog processing unit 103, an analog/digital conversion unit 104 (A/D conversion unit 104 hereafter), a bus 105, an SDRAM 106, an image processing unit 107, an AE processing unit 108, an AF processing unit 109, a JPEG processing unit 110, a memory interface 111 (memory I/F 111 hereafter), a storage medium 112, an LCD driver 113, an LCD 114, a microcomputer 115, an operation unit 116, and a flash memory 117.

The lens 1010 condenses an optical image of a subject onto the imaging device 102. The lens 1010 may be a single-vision lens or a zoom lens.

The microcomputer 1012 is connected to the I/F 999, the flash memory 1011 and the driver 1013 to read and write information stored in the flash memory 1011 and control the driver 1013. Further, the microcomputer 1012 is capable of communicating with the microcomputer 115 via the I/F 999 to transmit various information to the microcomputer 115 and receive information such as an aperture value from the microcomputer 115.

Upon reception of an instruction from the microcomputer 1012, the driver 1013 drives the lens 1010 to modify a focal distance and a focus position and drive the diaphragm 1014. The diaphragm 1014 is provided in the vicinity of the lens 1010 to adjust a light quantity of the object.

The mechanical shutter 101 is driven upon reception of an instruction from the microcomputer 115 to control the time during which the object is exposed to the imaging device 102.

The imaging device 102 is formed such that color filters in a Bayer arrangement are disposed on a front surface of a photodiode constituting each pixel. In the Bayer arrangement, a line on which an R pixel and a G (Gr) pixel are disposed alternately in a horizontal direction and a line on which a G (Gb) pixel and a B pixel are disposed in the horizontal direction are provided, and the two lines are disposed alternately in a vertical direction. The imaging device 102 receives light condensed by the lens 1010 on the photodiodes constituting the pixels and performs photoelectric conversion such that a light quantity is output to the analog processing unit 103 as an electric charge quantity. The imaging device 102 may be a CMOS device or a CCD device. Further, the imaging device may be of a type that is capable of taking in information relating to all of R, G and B in a single pixel, such as a FOVEON (registered trademark) image sensor, for example, rather than a type in which color filters are disposed in the Bayer arrangement.

The analog processing unit 103 reduces reset noise and the like and then performs waveform shaping on an electric signal (analog image signal) read from the imaging device 102, and also performs gain-up processing to obtain a target brightness. The A/D conversion unit 104 converts the analog image signal output from the analog processing unit 103 into a digital image signal (to be referred to hereafter as image data).

The bus 105 is a transfer path for transferring various data generated in the interior of the digital camera to the various internal units of the digital camera. The bus 105 is connected to the A/D conversion unit 104, the SDRAM 106, the image processing unit 107, the AE processing unit 108, the AF processing unit 109, the JPEG processing unit 110, the memory I/F 111, the LCD driver 113, and the microcomputer 115.

The image data output from the A/D conversion unit 104 are stored temporarily in the SDRAM 106 via the bus 105. The SDRAM 106 is a storage unit for temporarily storing various data such as the image data obtained in the A/D conversion unit 104 and image data processed in the image processing unit 107 and the JPEG processing unit 110.

The image processing unit 107 includes an optical black subtraction unit 1071 (OB subtraction unit 1071 hereafter), a white balance correction unit 1072 (WB correction unit 1072 hereafter), a synchronization processing unit 1073, a gamma/color reproduction processing unit 1074, a color matrix calculation unit 1075, an edge enhancement processing unit 1076, and a noise reduction processing unit 1077 (NR processing unit 1077 hereafter), and implements various types of image processing on image data read from the SDRAM 106.

The OB subtraction unit 1071 performs optical black subtraction processing (OB subtraction processing hereafter) on the image data. OB subtraction processing is processing for subtracting an optical black value (OB value hereafter) attributable to a dark current or the like of the imaging device 102 from a pixel value of each pixel constituting the image data.

The WB correction unit 1072 performs white balance correction processing by multiplying a white balance gain corresponding to a white balance mode by the image data. The white balance mode may be set by a user in accordance with light sources including clear sky, cloudy sky, an incandescent lamp, and a fluorescent lamp.

The synchronization processing unit 1073 synchronizes image data in the Bayer arrangement into image data in which R, G, B information is included in each pixel. The gamma/color reproduction processing unit 1074 performs gamma correction processing and color reproduction processing for varying the tint of the image.

The color matrix calculation unit 1075 corrects the colors of the image data by performing a linear transformation in which a color matrix is multiplied by the image data. The edge enhancement processing unit 1076 performs edge enhancement processing on the image data by extracting an edge from the image data, multiplying the data relating to the extracted edge by a predetermined gain, and then adding the result to the image data. The NR processing unit 1077 performs noise reduction processing through processing employing a filter that reduces high frequencies, coring processing, and so on.

The image processing unit 107 performs these various types of processing by selecting the internal units 1071 to 1077 as necessary. Following the various processing performed by the image processing unit 107, the image data are stored in the SDRAM 106.

The AE processing unit 108 calculates an object luminance from the image data. Data for calculating the object luminance may be constituted by an output of a dedicated photometric sensor. The AF processing unit 109 extracts a high frequency component signal from the image data and obtains a focus evaluation value through AF (Auto Focus) integration processing.

When the image data are to be recorded, the JPEG processing unit 110 reads the image data from the SDRAM 106, compresses the read image data in accordance with a JPEG compression format, and stores the compressed JPEG image data temporarily in the SDRAM 106. The microcomputer 115 creates a JPEG file by attaching a JPEG header required to form the JPEG file to the JPEG image data stored in the SDRAM 106, and records the created JPEG file in the recording medium 112 via the memory I/F 111. The recording medium 112 is a memory card that can be attached to and detached from the camera main body 1, for example, but is not limited thereto.

The LCD driver 113 displays images on the LCD 114. When the JPEG file recorded in the recording medium 112 is to be reproduced, the JPEG processing unit 110 reads the JPEG file recorded in the recording medium 112, implements enlargement processing on the JPEG file, and stores the enlarged image data temporarily in the SDRAM 106. The LCD driver 113 reads the enlarged image data from the SDRAM 106, converts the read image data into an image signal, and then outputs the image signal to the LCD 114 so that the image can be displayed. Image display includes not only static image display but also display of moving images such as live view display images.

The microcomputer 115, which functions as a control unit, controls various sequences of the digital camera main body 1 comprehensively. The operation unit 116 and the flash memory 117 are connected to the microcomputer 115.

The operation unit 116 is constituted by operating members such as a power button, a release button, and various types of input keys. The microcomputer 115 performs various types of sequences according to the operation of either of the operation members of the operation unit 116 performed by the user. A power button is an operation member for performing ON/OFF directions of the power of the digital camera. When the power button is pushed, the microcomputer 115 turns on or turns off the power of the digital camera. The release button is arranged to include two-step switches, which consists of a first release switch and a second release switch. When the release button is half-pushed to turn the first release switch on, the microcomputer 115 performs the shooting preparation sequences such as AE processing and AF processing. When the release button is fully-pushed to turn the second release switch on, the microcomputer 115 performs the shooting by executing the shooting sequences.

The flash memory 117 stores various parameters required to operate the digital camera, such as white balance gains corresponding to white balance modes and a low pass filter coefficient, a serial number identifying the digital still camera, and so on. Moreover, various types of programs which are to be executed by the microcomputer 115 are also stored in the flash memory 117. The microcomputer 115 reads from the flash memory 117 parameters required for various types of sequences and executes the processing according to the program stored in the flash memory 117.

Figure 2:
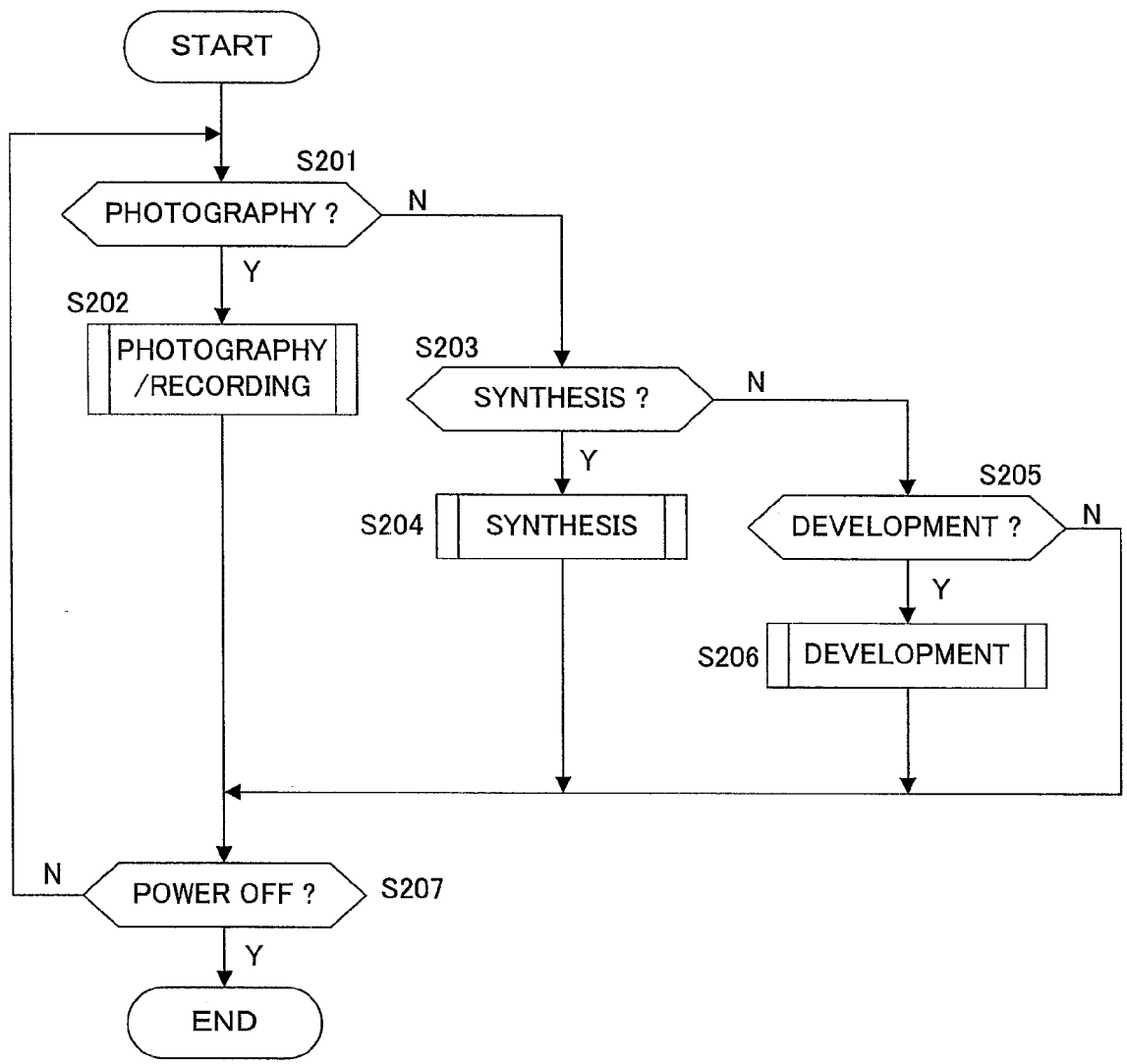
FIG. 2 is a flowchart showing a main processing flow performed by the digital still camera to which the image processing apparatus according to the first embodiment is applied.

FIG. 2 is a flowchart showing a main processing flow performed by the digital still camera to which the image processing apparatus according to the first, embodiment is applied. When the user presses the power button such that the power of the digital still camera is switched ON, the microcomputer 115 begins the processing of a step S201.

In the step S201, a determination is made as to whether or not photography is to be performed, or in other words whether or not the release button has been depressed. When it is determined that the release button has been depressed, the routine advances to a step S202, in which a photography/recording operation is performed. The photography/recording operation will be described below using a flowchart shown in FIG. 3.

When it is determined in the step S201 that the release button has not been depressed, the routine advances to a step S203. In the step S203, a determination is made as to whether or not image data synthesis processing is to be performed. When the user operates an input key included in the operation unit 116 and selects an image data synthesis menu from a plurality of menus displayed on the LCD 114, it is determined that image data synthesis processing is to be performed, and the routine advances to a step S204. In the step S204, the image data synthesis processing is performed. The content of the image data synthesis processing will be described in detail below using a flowchart shown in FIG. 4.

When it is determined that image data synthesis processing is not to be performed, the routine advances to a step S205. In the step S205, a determination is made as to whether or not image data development processing is to be performed. When the user operates an input key included in the operation unit 116 and selects an image data development menu from the plurality of menus displayed on the LCD 114, it is determined that development processing is to be performed, and the routine advances to a step S206. In the step S206, the image data development processing is performed. The content of the image data development processing will be described in detail below using a flowchart shown in FIG. 5.

In a step S207, a determination is made as to whether or not, the power of the digital still camera has been switched OFF, or in other words whether or not the user has pressed the power button to switch the power OFF. When it is determined that the power has not been switched OFF, the routine returns to the step S201, and when it is determined that the power is OFF, all operations are terminated.

Figure 3:
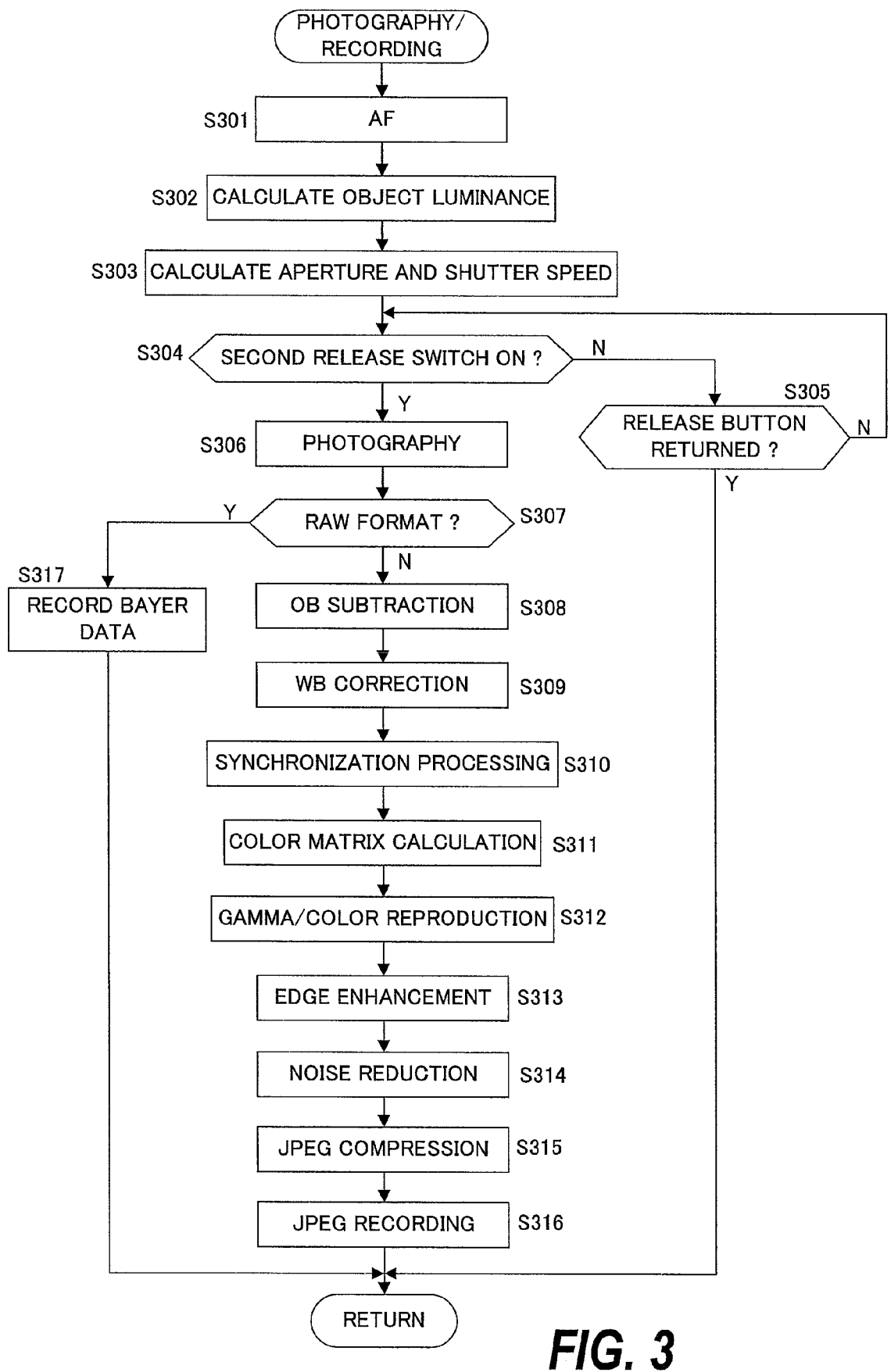
FIG. 3 is a flowchart showing in detail the processing content of the photography/recording operation.

FIG. 3 is a flowchart showing in detail the processing content of the photography/recording operation performed in the step S202 of the flowchart shown in FIG. 2. The processing of a step S301 to a step S303 is performed upon the first release switch is turned on, while the processing of a step S304 onward is performed upon the second release switch is turned on.

In the step S301, the focus evaluation value is calculated by the AF processing unit 109. On the basis of the focus evaluation value, the microcomputer 115 issues a command to the driver 1013 to drive the lens 1010.

In the step S302, the object luminance is calculated by the AE processing unit 109. In the step S303, the aperture and a shutter speed are calculated on the basis of the object luminance by referring to an aperture value and shutter speed determination table stored in the flash memory 117.

In the step S304, a determination is made as to whether or not the user has pressed the release button fully to switch a second release switch ON. When it is determined that the second release switch is not ON, the routine advances to a step S305. In the step S305, a determination is made as to whether or not the release button has been returned. When it is determined that the release button has been returned from a half-depressed state, the photography/recording operation is terminated, and when it is determined that the release button has not been returned, the routine returns to the step S304.

When it is determined in the step S304 that the second release switch has been switched ON, on the other hand, the routine advances to a step S306. In the step S306, photography is performed. The photography can be performed as in the conventional methods. The driver 1013 drives the diaphragm 1014 based on directions of the microcomputer 1012 so that the aperture becomes the set aperture value. Then, based on the calculated shutter speed, the mechanical shutter 101 is controlled for the photography to obtain the image data.

In a step S307, a determination is made as to whether or not the image recording format is a RAW format. The user may select the image recording format prior to photography by operating the operation unit 116. When it is determined that the image recording format is the RAW format, the routine advances to a step S317, in which Bayer data, i.e. RAW format data, are recorded in the recording medium 112 via the memory I/F 111. It should be noted that here, thumbnail image data are created for each set of Bayer data to be recorded and recorded together with the Bayer data. Further, an OB value obtained during photography, the white balance gain corresponding to the white balance mode, and a color matrix corresponding to the white balance mode are recorded at the same time with the Bayer data in an identical file.

It should be noted that the user may set the white balance mode for each photography operation by operating an input key included in the operation unit 116. The microcomputer 115 sets the white balance mode on the basis of the operation of the operation unit 116 performed by the user. Further, when the digital still camera includes an auto white balance function for adjusting the white balance automatically, the microcomputer 115 sets a white balance mode corresponding to the light source at the time of the photography operation automatically.

Meanwhile, when it is determined in the step S307 that the image recording format is the JPEG format, the routine advances to a step S308. In the step S308, the OB subtraction unit 1071 implements OB subtraction processing to subtract the OB value obtained during the photography from the image data obtained by the photography.

In a step S309, the WB correction unit 1072 performs white balance correction processing by multiplying the white balance gain corresponding to the white balance mode by the image data subjected to the OB subtraction processing.

In a step S310, the synchronization processing unit 1073 implements synchronization processing on the image data subjected to the white balance correction processing.

In a step S311, the color matrix calculation unit 1075 performs a color matrix calculation in which a color matrix corresponding to the white balance mode is multiplied by the image data subjected to the synchronization processing.

In a step S312, the gamma/color reproduction processing unit 1074 performs gamma correction processing and color reproduction processing for varying the tint of the image on the image data subjected to the color matrix calculation.

In a step S313, the edge enhancement processing unit 1076 performs edge enhancement processing on the image data subjected to the gamma correction processing and color reproduction processing.

In a step S314, the NR processing unit 1077 performs noise reduction processing on the image data subjected to the edge enhancement processing.

In a step S315, the JPEG processing unit 110 performs JPEG compression on the image data subjected to the noise reduction processing. In a step S316, photography information such as the image recording mode and the exposure conditions is created as file header information, and the created file header information is attached to the JPEG-compressed image data. The data are then recorded in the recording medium 112 via the memory I/F 111.

Figure 4:
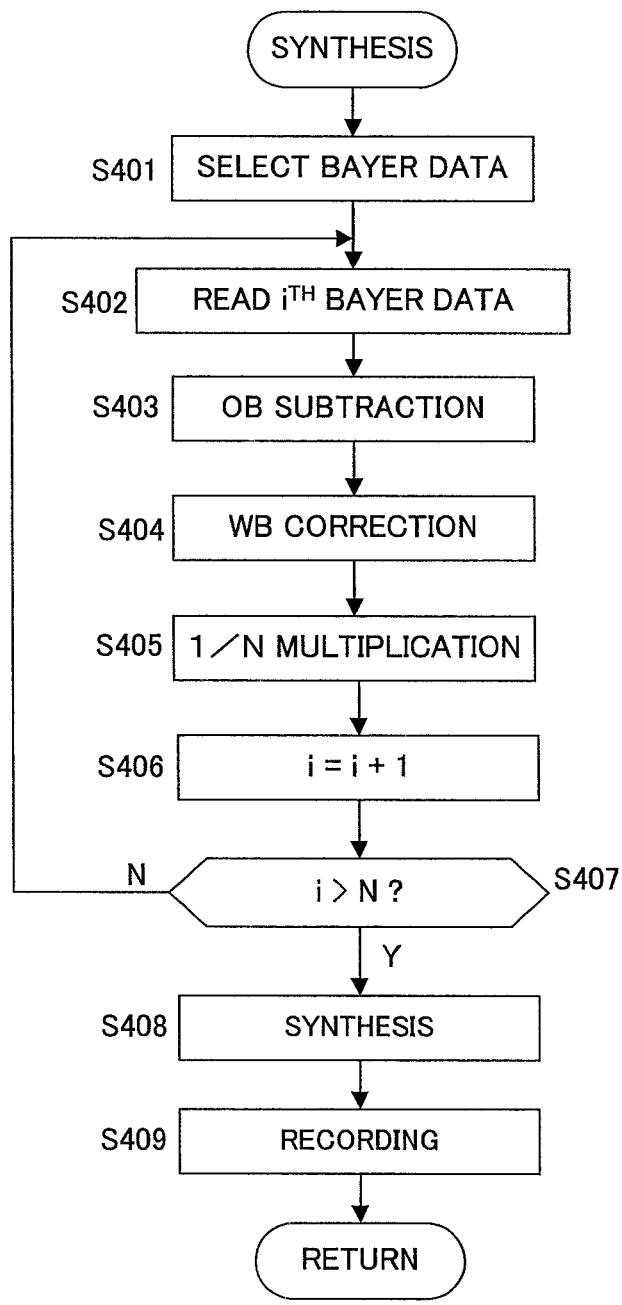
FIG. 4 is a flowchart showing in detail the processing content of the synthesis processing.

FIG. 4 is a flowchart showing in detail the processing content of the synthesis processing performed in the step S204 of the flowchart shown in FIG. 2. In a step S401, two or more sets of Bayer data to be subjected to synthesis processing are selected in accordance with an operation of the operation unit 116 by the user. Here, first, a plurality of thumbnail image data recorded in the recording medium 112 is displayed on the LCD 114. Then, when the user selects two or more sets of thumbnail image data to be subjected to synthesis processing, Bayer data corresponding to the selected thumbnail image data are selected from a plurality of Bayer data recorded in the recording medium 112. It is assumed hereafter that N (where N is a natural number of 2 or more) sets of Bayer data are selected.

In a step S402, an $i^{th}$ set of Bayer data, from among the selected N sets of Bayer data, is read from the recording medium 112. It should be noted that an initial value of the parameter i is set at 1. The sequence in which the N sets of Bayer data are read may be selected by the user or set arbitrarily.

In a step S403, the OB subtraction unit 1071 implements OB subtraction processing on the Bayer data read in the step S402 using the OB value recorded in the same file as the read Bayer data. In a step S404, the WB correction unit 1072 implements white balance correction processing on the Bayer data subjected to the OB subtraction processing using the white balance gain recorded in the same file as the read Bayer data.

In a step S405, a pixel value of each pixel constituting the Bayer data subjected to the white balance correction processing is multiplied by 1/N. This processing is performed to maintain an appropriate level of brightness when the N sets of Bayer data are synthesized to generate a single synthesized image.

It should be noted that the value multiplied by the pixel value is not limited to 1/N. For example, when four sets of Bayer data are synthesized and each set of selected Bayer data has been photographed with one step underexposure (half the appropriate exposure amount), 0.5 (½) is preferably used as the coefficient.

In a step S406, 1 is added to the parameter i. In a step S407, a determination is made as to whether or not the parameter i has a larger value than the number of synthesized images N. When it is determined that the parameter i is not larger than N, the routine returns to the step S402, whereupon the processing of the step S402 to the step S407 is performed. When it is determined that the parameter i is larger than N, on the other hand, the value of the parameter i is set at the initial value 1, whereupon the routine advances to a step S408. Thus, white balance correction processing corresponding to the white balance mode of each Bayer data set is implemented on all of the synthesis subject Bayer data.

In the step S408, processing is performed to synthesize the N sets of Bayer data. Here, a single set of synthesized image data is generated by adding together the pixel values of the respective pixels constituting the N sets of Bayer data at an identical coordinate value.

In a step S409, the generated synthesized image data are recorded in the recording medium 112 via the memory I/F 111. Here, the synthesized image data have not yet undergone image processing, and are therefore recorded in the recording medium 112 as Bayer data. At this time, thumbnail image data are created in relation to the synthesized image data to be recorded and recorded together with the synthesized image data. Furthermore, an OB value, a white balance gain and a color matrix for use during development processing of the generated synthesized image data are recorded in the same file as the generated synthesized image data. The recorded OB value is set at 0, the white balance gain is set at 1.0, and the color matrix is set at a specific color matrix (for example, a color matrix for clear sky).

Figure 5:
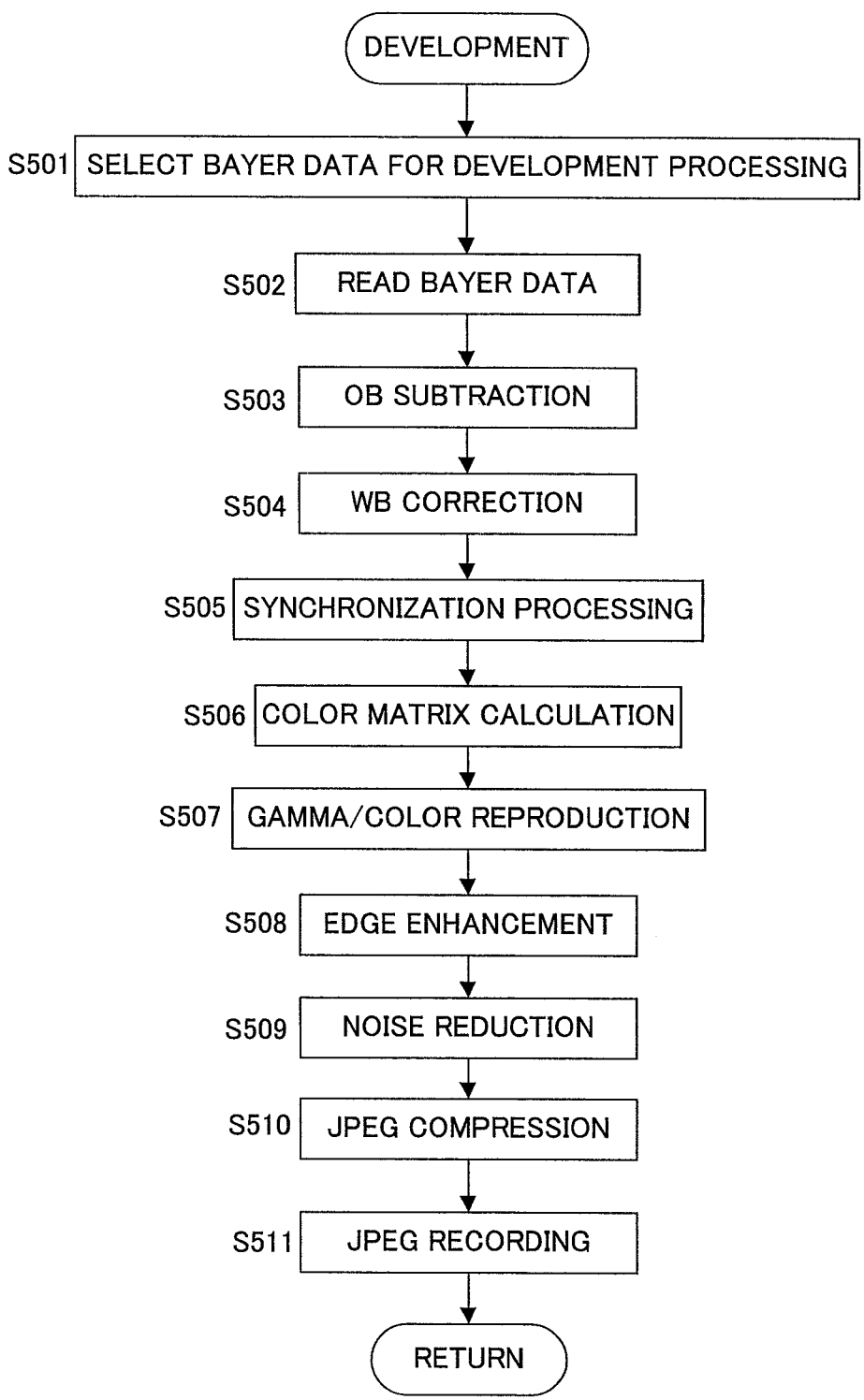
FIG. 5 is a flowchart showing in detail the processing content of the development processing.

FIG. 5 is a flowchart showing in detail the processing content of the development processing performed in the step S206 of the flowchart shown in FIG. 2. In a step S501, the Bayer data to be subjected to the development processing is selected in accordance with an operation of the operation unit 116 by the user. Here, first, the plurality of thumbnail image data recorded in the recording medium 112 is displayed on the LCD 114. Then, when the user selects thumbnail image data to be subjected to the development processing, Bayer data corresponding to the selected thumbnail image data are selected from the plurality of Bayer data recorded in the recording medium 112.

In a step S502, the Bayer data selected in the step S501 are read from the recording medium 112. In a step S503, the OB subtraction unit 1071 implements OB subtraction processing on the read Bayer data using the OB value recorded in the same file as the read Bayer data. When synthesized image data are subjected to development processing, the recorded OB value is 0, and it may therefore be assumed that OB subtraction processing is essentially not performed.

In a step S504, the WB correction unit 1072 implements white balance correction processing on the data subjected to the OB subtraction processing using the white balance gain recorded in the same file as the read Bayer data. When synthesized image data are subjected to development processing, the recorded white balance gain is 1.0, and it may therefore be assumed that white balance correction processing is essentially not performed.

As described above, when synthesized image data are subjected to development processing, it may be assumed that OB subtraction processing and white balance correction processing are essentially not performed, and hence the processing of the steps S503 and S504 need not be performed.

In a step S505, the synchronization processing unit 1073 implements synchronization processing on the data subjected to the white balance correction processing. In a step S506, the color matrix calculation unit 1075 performs a color matrix calculation on the data subjected to the synchronization processing using the color matrix recorded in the same file as the read Bayer data.

In a step S507, the gamma/color reproduction processing unit 1074 performs gamma correction processing and color reproduction processing for varying the tint of the image on the data subjected to the color matrix calculation.

In a step S508, the edge enhancement processing unit 1076 performs edge enhancement processing on the data subjected to the gamma correction processing and color reproduction processing. In a step S509, the NR processing unit 1077 performs noise reduction processing on the data subjected to the edge enhancement processing.

In a step S510, the JPEG processing unit 110 performs JPEG compression on the data subjected to the noise reduction processing. In a step S511, photography information such as the image recording mode and the exposure conditions is created as file header information, and the created file header information is attached to the JPEG-compressed data. The data are then recorded in the recording medium 112 via the memory I/F 111.

With the image processing apparatus according to the first embodiment, synthesized image data are generated by performing white balance correction processing corresponding to a setting of white balance correction processing on each of a plurality of RAW image data obtained during photography and then synthesizing the plurality of image data subjected to the white balance correction processing. Hence, even when a plurality of RAW image data photographed under different light sources is synthesized, synthesized image data having a correct white balance can be generated.

Further, when image processing is implemented on the synthesized image data, either white balance correction processing is not performed or white balance correction processing resulting in essentially no change is performed, and therefore duplicate white balance correction processing can be avoided.

Second Embodiment

The constitution of an image processing apparatus according to a second embodiment is identical to the constitution of the image processing apparatus according to the first embodiment, shown in FIG. 1. The image processing apparatus according to the second embodiment differs from the image processing apparatus according to the first embodiment in the synthesis processing that is performed in the step S204 of the flowchart shown in FIG. 2. In the image processing apparatus according to the second embodiment, color matrix calculation processing is performed on the plurality of synthesis subject RAW image data in addition to white balance correction processing.

Figure 6:
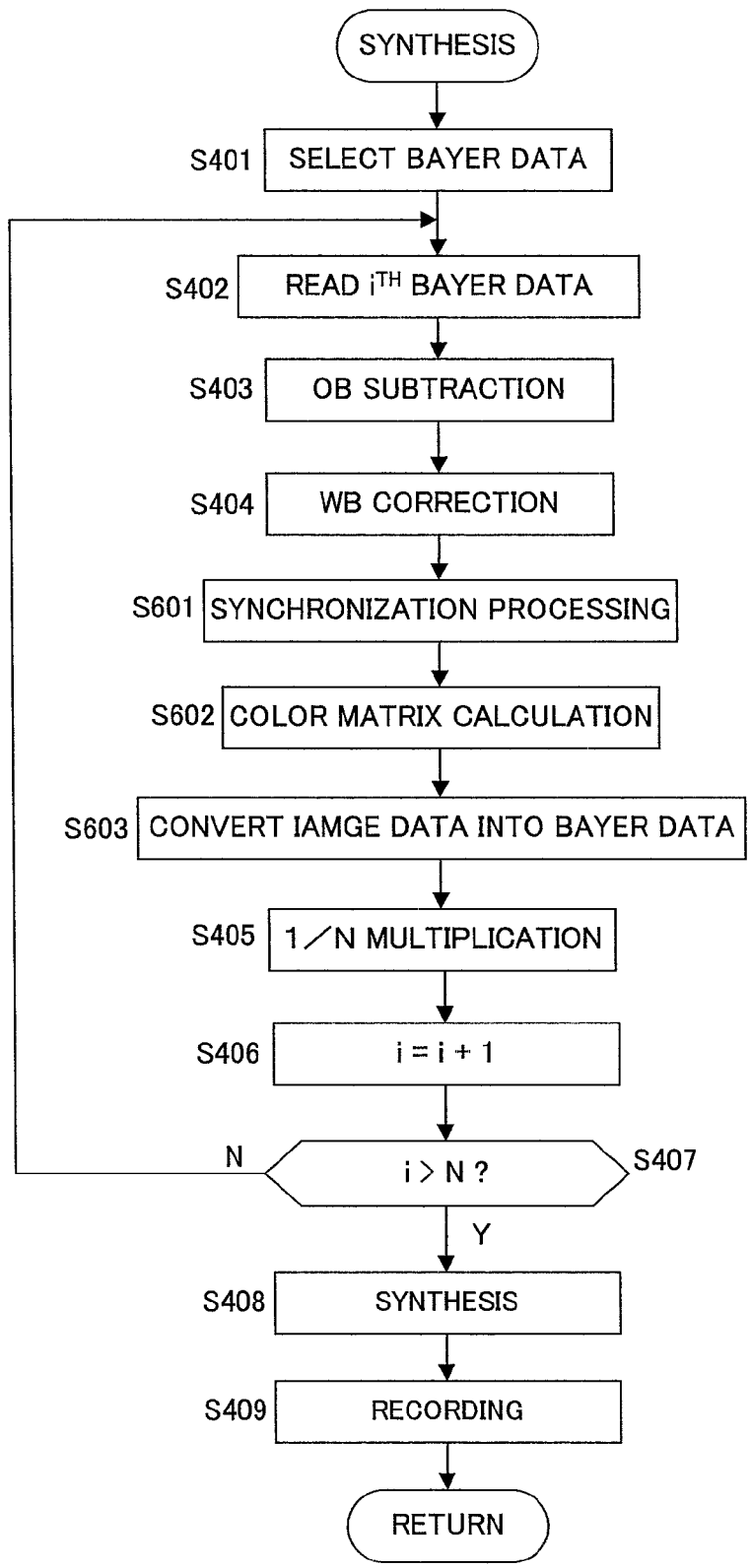
FIG. 6 is a flowchart showing in detail the content of the synthesis processing performed by the image processing apparatus according to a second embodiment.

FIG. 6 is a flowchart showing in detail the content of the synthesis processing performed by the image processing apparatus according to the second embodiment. Steps in which identical processing to that of the flowchart shown in FIG. 4 is performed have been allocated identical step numbers, and detailed description thereof has been omitted.

Once the white balance correction processing has been performed in the step S404, the routine advances to a step S601. In the step S601, the synchronization processing unit 1073 implements synchronization processing on the image data subjected to the white balance correction processing.

In a step S602, the color matrix calculation unit 1075 performs a color matrix calculation in which the color matrix recorded in the same file as the processing subject Bayer data is multiplied by the image data subjected to the synchronization processing.

In a step S603, processing is performed to convert the image data subjected to the color matrix calculation into Bayer data. More specifically, the data subjected to the synchronization processing in the step S601 include R, G, B data in each pixel, and therefore, to return the data to Bayer data, processing is performed to extract one of the R, G, B data on the basis of the Bayer arrangement.

The processing of the step S405 onward is identical to that of the flowchart shown in FIG. 4. However, when the synthesized image data are recorded in the recording medium 112 in the step S409, the OB value recorded in the same file is set at 0, the white balance gain is set at 1.0, and the color matrix is set at a unit matrix. By setting the recorded color matrix as a unit matrix, the synthesized image data do not change following the color matrix calculation when development processing is performed on the synthesized image data. It should be noted that the color matrix calculation need not be performed when development processing is performed on the synthesized image data.

With the image processing apparatus according to the second embodiment, synthesized image data are generated by performing white balance correction processing corresponding to a setting of white balance correction processing on each of a plurality of RAW image data obtained during photography, performing a color matrix calculation corresponding to the white balance setting, and then synthesizing the plurality of image data subjected to the color matrix calculation. Hence, synthesized image data having an accurate white balance and also exhibiting accurate color reproduction can be generated.

Further, when image processing is implemented on the synthesized image data, either the color matrix calculation is not performed or a color matrix calculation resulting in essentially no change is performed, and therefore duplicate color matrix calculations can be avoided.

Third Embodiment

In the image processing apparatuses according to the first and second embodiments described above, the white balance gain is set at 1.0 when image processing is performed on synthesized image data obtained by synthesizing a plurality of Bayer data, and therefore the white balance correction processing is essentially not performed. In the image processing apparatus according to the third embodiment, white balance correction processing corresponding to a different light source to the light source at the time of photography, for example, is performed. It should be noted that the constitution of the image processing apparatus according to the third embodiment is identical to the constitution of the image processing apparatus according to the first embodiment, shown in FIG. 1.

FIG. 7 is a view showing an example of white balance gains corresponding to white balance modes. Here, four white balance modes, namely an incandescent lamp mode, a clear sky mode, a cloudy sky mode, and a shadow mode, may be set. For example, when the white balance mode is the incandescent lamp mode, an R gain and a B gain of the white balance gain are set at 1.0 and 2.5, respectively.

When development processing is performed on the synthesized image data, the WB correction unit 1072 performs white balance correction processing using a white balance gain obtained by dividing the white balance gain of the white balance mode set by the user by a predetermined white balance gain. The predetermined white balance gain is a white balance gain corresponding to one of the settable white balance modes (the incandescent lamp mode, clear sky mode, cloudy sky mode, and shadow mode in the example shown in FIG. 7). Here, the predetermined white balance gain is assumed to be the white balance gain corresponding to the clear sky white balance mode. It should be noted that the predetermined white balance gain is not limited to the white balance gain corresponding to the clear sky white balance mode.

When the white balance mode set by the user is the incandescent lamp mode, for example, the R gain and B gain of the white balance gain used in the white balance correction processing are expressed by the following Equations (1) and (2), respectively.

$$R\text{gain} = 1.0/2.0 \tag{1}$$

$$B\text{gain} = 2.5/1.5 \tag{2}$$

In this case, the white balance correction processing is performed by multiplying the R gain by an R signal of the synthesized image data and multiplying the B gain by a B signal of the synthesized image data.

With the image processing apparatus according to the third embodiment, when image processing is implemented on synthesized image data, white balance correction processing is performed using a white balance gain obtained by dividing the white balance gain corresponding to the setting of white balance correction processing by the predetermined white balance gain. As a result, the white balance correction processing desired by the user can be implemented appropriately on the synthesized image data. For example, by performing white balance correction processing using the white balance gain corresponding to the incandescent lamp white balance mode on synthesized image data obtained by synthesizing a plurality of RAW image data obtained under a clear sky, a synthesized image having enhanced blueness can be obtained.

Further, any one of the plurality of settable white balance gains is used as the predetermined white balance gain, and therefore white balance correction processing can be performed appropriately without being affected by variation in the white balance gains of individual cameras.

In the above description of the first to third embodiments, it is assumed that the image processing apparatus is applied to the digital still camera, but it may be applied to an electronic apparatus other than the digital still camera. Moreover, a computer may execute the program for realizing the processing according to the first to third embodiments. For example, the computer includes a CPU, a main storage device such as a RAM, and a computer-readable storage medium storing a program for realizing all or a part of the processing described in each embodiment. Here, the program is referred to as an image processing program. By having the CPU read the image processing program stored on the storage medium and execute information processing/calculation processing, similar processing to that of the image processing apparatus described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the embodiments described above, and may be subjected to various modifications and applications within a scope that does not depart from the spirit of the invention. For example, the settable white balance modes of the digital still camera are not limited to the four modes, namely the incandescent lamp mode, clear sky mode, cloudy sky mode and shadow mode, shown in FIG. 7.

In the embodiments described above, Bayer data are cited as an example of RAW image data, but the RAW image data are not limited to Bayer data, and any undeveloped data may be used.

The white balance gain recorded in the same file as the synthesized image data is set at 1.0, but a gain of approximately 1, at which white balance correction is essentially not performed, may be used instead. Further, in the second embodiment, the color matrix recorded in the same file as the synthesized image data is a unit matrix, but any matrix with which the color matrix calculation is essentially not performed may be used.

This application claims priority based on JP2008-298462, filed with the Japan Patent Office on Nov. 21, 2008, the entire contents of which are incorporated into this specification by reference.

What is claimed is:

1. An image processing apparatus comprising:
a white balance correction unit that performs white balance correction processing by multiplying each of a plurality of RAW images obtained in a photography operation by a corresponding white balance gain parameter that was determined according to a white balance mode set at the photograph operation;
an image synthesizing unit that generates synthesized image data by synthesizing a plurality of RAW images that were subjected to the white balance correction processing by the white balance correction unit; and
a recording unit that records the synthesized image data,
wherein each of the plurality of RAW images was obtained either (A) in an auto white balance mode in which the white balance mode is set automatically corresponding to a light source, or (B) in a manual white balance mode in which a user sets the white balance mode corresponding to the light source,
wherein at least one RAW image of the plurality of RAW images obtained in the photography operation corresponds to a white balance gain parameter which is different from a white balance gain parameter corresponding to another of the plurality of RAW images, and
wherein the recording unit records additional information indicating that a white balance gain for the white balance correction processing is set at approximately 1 in association with the synthesized image data.

2. The image processing apparatus as defined in claim 1, further comprising a color matrix calculation unit that performs a color matrix calculation corresponding to the white balance mode on each of the plurality of RAW images subjected to the white balance correction processing,
wherein the image synthesizing unit generates synthesized image data by synthesizing a plurality of RAW images subjected to the color matrix calculation.

3. The image processing apparatus as defined in claim 2, further comprising an image processor that performs image processing on the synthesized image, wherein, when image processing is performed on the synthesized image data, the white balance correction unit either does not perform the white balance correction processing or performs white balance correction processing resulting in essentially no change following the processing.

4. The image processing apparatus as defined in claim 2, further comprising an image processor that performs image processing on the synthesized image, wherein, when image processing is performed on the synthesized image data, the color matrix calculation unit either does not perform the color matrix calculation or performs a color matrix calculation resulting in essentially no change following the calculation.

5. The image processing apparatus as defined in claim 4, further comprising a recording unit that records the synthesized image data,
wherein the recording unit records additional information indicating that a color matrix used in the color matrix calculation is a unit matrix in association with the synthesized image data.

6. The image processing apparatus as defined in claim 2, further comprising a recording unit that records the synthesized image data,
wherein the recording unit records additional information indicating that a color matrix used in the color matrix calculation is a unit matrix in association with the synthesized image data.

7. The image processing apparatus as defined in claim 1, further comprising an image processor that performs image processing on the synthesized image, wherein, when image processing is performed on the synthesized image data, the white balance correction unit either does not perform the white balance correction processing or performs white balance correction processing resulting in essentially no change following the processing.

8. The image processing apparatus as defined in claim 1, further comprising an optical black correction unit which implements optical black subtraction processing on the RAW images using an optical black value recorded with the RAW images.

9. The image processing apparatus as defined in claim 1, wherein the plurality of RAW images obtained in a photography operation are from a plurality of images obtained from a plurality of exposures.

10. An image processing apparatus comprising:
a white balance correction unit that performs white balance correction processing by multiplying each of a plurality of RAW images obtained in a photography operation by a corresponding white balance gain parameter that was determined according to a white balance mode set at the photograph operation;
an image synthesizing unit that generates synthesized image data by synthesizing a plurality of RAW images that were subjected to the white balance correction processing by the white balance correction unit;
a white balance setting unit that performs a setting of white balance correction processing on an image data; and
an image processor that performs image processing on the synthesized image,
wherein each of the plurality of RAW images was obtained either (A) in an auto white balance mode in which the white balance mode is set automatically corresponding to a light source, or (B) in a manual white balance mode in which a user sets the white balance mode corresponding to the light source,
wherein at least one RAW image of the plurality of RAW images obtained in the photography operation corresponds to a white balance gain parameter which is different from a white balance gain parameter corresponding to another of the plurality of RAW images, and
wherein, when image processing is performed on the synthesized image data, the white balance correction unit performs the white balance correction processing using a white balance gain obtained by dividing a white balance gain corresponding to the setting by the white balance setting unit by a predetermined white balance gain.

11. The image processing apparatus as defined in claim 10, wherein the predetermined white balance gain is one of a plurality of white balance gains that can be set by the white balance setting unit.

12. An image processing apparatus comprising:
a white balance correction unit that performs white balance correction processing by multiplying each of a plurality of RAW images obtained in a photography operation by a corresponding white balance gain parameter that was determined according to a white balance mode set at the photograph operation;
an image synthesizing unit that generates synthesized image data by synthesizing a plurality of RAW images that were subjected to the white balance correction processing by the white balance correction unit; and
a color matrix calculation unit that performs a color matrix calculation corresponding to the white balance mode on each of the plurality of RAW images subjected to the white balance correction processing;
a white balance setting unit that performs a setting of white balance correction processing on an image data; and
an image processor that performs image processing on the synthesized image,
wherein each of the plurality of RAW images was obtained either (A) in an auto white balance mode in which the white balance mode is set automatically corresponding to a light source, or (B) in a manual white balance mode in which a user sets the white balance mode corresponding to the light source,
wherein at least one RAW image of the plurality of RAW images obtained in the photography operation corresponds to a white balance gain parameter which is different from a white balance gain parameter corresponding to another of the plurality of RAW images,
wherein the image synthesizing unit generates synthesized image data by synthesizing a plurality of RAW images subjected to the color matrix calculation, and
wherein, when image processing is performed on the synthesized image data, the white balance correction unit performs the white balance correction processing using a white balance gain obtained by dividing a white balance gain corresponding to the setting by the white balance setting unit by a predetermined white balance gain.

13. The image processing apparatus as defined in claim 12, wherein the predetermined white balance gain is one of a plurality of white balance gains that can be set by the white balance setting unit.

14. An image processing method comprising:
a step of performing white balance correction processing by multiplying each of a plurality of RAW images obtained in a photography operation by a corresponding white balance gain parameter that was determined according to a white balance mode set at the photograph operation; and
a step of generating synthesized image data by synthesizing a plurality of RAW images that were subjected to the white balance correction processing in the step of performing white balance correction processing, and
a step of recording the synthesized image data,
wherein the step of recording records additional information indicating that a white balance gain for the white balance correction processing is set at approximately 1 in association with the synthesized image data,
wherein each of the plurality of RAW images was obtained either (A) in an auto white balance mode in which the white balance mode is set automatically corresponding to a light source, or (B) in a manual white balance mode in which a user sets the white balance mode corresponding to the light source, and
wherein at least one RAW image of the plurality of RAW images obtained in the photography operation corresponds to a white balance gain parameter which is different from a white balance gain parameter corresponding to another of the plurality of RAW images.

15. The image processing method as defined in claim 14, further comprising a step of performing a color matrix calculation corresponding to the white balance mode on each of the plurality of RAW images subjected to the white balance correction processing,
wherein the synthesized image data is generated by synthesizing a plurality of RAW images subjected to the color matrix calculation in the step of generating the synthesized image data.

16. A non-transitory storage medium storing an image processing program, wherein the image processing program causes a computer to execute:
a step of performing white balance correction processing by multiplying each of a plurality of RAW images obtained in a photography operation by a corresponding white balance gain parameter that was determined according to a white balance mode set at the photograph operation; and a step of generating synthesized image data by synthesizing a plurality of RAW images that were subjected to the white balance correction processing in the step of performing white balance correction processing, and a step of recording the synthesized image data, wherein the step of recording records additional information indicating that a white balance gain for the white balance correction processing is set at approximately 1 in association with the synthesized image data, wherein each of the plurality of RAW images was obtained either (A) in an auto white balance mode in which the white balance mode is set automatically corresponding to a light source, or (B) in a manual white balance mode in which a user sets the white balance mode corresponding to the light source, and wherein at least one RAW image of the plurality of RAW images obtained in the photography operation corresponds to a white balance gain parameter which is different from a white balance gain parameter corresponding to another of the plurality of RAW images.

17. The non-transitory storage medium as defined in claim 16, wherein the image processing program further causes a computer to execute a step of performing a color matrix calculation corresponding to the white balance mode on each of the plurality of RAW images subjected to the white balance correction processing, and the synthesized image data is generated by synthesizing a plurality of RAW images subjected to the color matrix calculation in the step of generating the synthesized image data.

18. An image processing method comprising:

a step of performing white balance correction processing by multiplying each of a plurality of RAW images obtained in a photography operation by a corresponding white balance gain parameter that was determined according to a white balance mode set at the photograph operation;

a step of generating synthesized image data by synthesizing a plurality of RAW images that were subjected to the white balance correction processing in the step of performing white balance correction processing;

a step of performing a setting of white balance correction processing on an image data; and a step of performing image processing on the synthesized image, wherein each of the plurality of RAW images was obtained either (A) in an auto white balance mode in which the white balance mode is set automatically corresponding to a light source, or (B) in a manual white balance mode in which a user sets the white balance mode corresponding to the light source, wherein at least one RAW image of the plurality of RAW images obtained in the photography operation corresponds to a white balance gain parameter which is different from a white balance gain parameter corresponding to another of the plurality of RAW images, and wherein, when image processing is performed on the synthesized image data, the white balance correction processing is performed using a white balance gain obtained by dividing a white balance gain corresponding to the setting of the white balance correction processing by a predetermined white balance gain.

19. A non-transitory storage medium storing an image processing program, wherein the image processing program causes a computer to execute:

a step of performing white balance correction processing by multiplying each of a plurality of RAW images obtained in a photography operation by a corresponding white balance gain parameter that was determined according to a white balance mode set at the photograph operation;

a step of generating synthesized image data by synthesizing a plurality of RAW images that were subjected to the white balance correction processing in the step of performing white balance correction processing;

a step of performing a setting of white balance correction processing on an image data; and a step of performing image processing on the synthesized image, wherein each of the plurality of RAW images was obtained either (A) in an auto white balance mode in which the white balance mode is set automatically corresponding to a light source, or (B) in a manual white balance mode in which a user sets the white balance mode corresponding to the light source, wherein at least one RAW image of the plurality of RAW images obtained in the photography operation corresponds to a white balance gain parameter which is different from a white balance gain parameter corresponding to another of the plurality of RAW images, and wherein, when image processing is performed on the synthesized image data, the white balance correction processing is performed using a white balance gain obtained by dividing a white balance gain corresponding to the setting of the white balance correction processing by a predetermined white balance gain.

20. An image processing method comprising:

a step of performing white balance correction processing by multiplying each of a plurality of RAW images obtained in a photography operation by a corresponding white balance gain parameter that was determined according to a white balance mode set at the photograph operation;

a step of generating synthesized image data by synthesizing a plurality of RAW images that were subjected to the white balance correction processing in the step of performing white balance correction processing;

a step of performing a color matrix calculation corresponding to the white balance mode on each of the plurality of RAW images subjected to the white balance correction processing;

a step of performing a setting of white balance correction processing on an image data; and a step of performing image processing on the synthesized image, wherein each of the plurality of RAW images was obtained either (A) in an auto white balance mode in which the white balance mode is set automatically corresponding to a light source, or (B) in a manual white balance mode in which a user sets the white balance mode corresponding to the light source, wherein at least one RAW image of the plurality of RAW images obtained in the photography operation corresponds to a white balance gain parameter which is different from a white balance gain parameter corresponding to another of the plurality of RAW images, wherein the step of generating generates synthesized image data by synthesizing a plurality of RAW images subjected to the color matrix calculation, and wherein, when image processing is performed on the synthesized image data, the white balance correction processing is performed using a white balance gain obtained by dividing a white balance gain corresponding to the setting of the white balance correction processing by a predetermined white balance gain.

21. A non-transitory storage medium storing an image processing program, wherein the image processing program causes a computer to execute:
   a step of performing white balance correction processing by multiplying each of a plurality of RAW images obtained in a photography operation by a corresponding white balance gain parameter that was determined according to a white balance mode set at the photograph operation;
   a step of generating synthesized image data by synthesizing a plurality of RAW images that were subjected to the white balance correction processing in the step of performing white balance correction processing;
   a step of performing a color matrix calculation corresponding to the white balance mode on each of the plurality of RAW images subjected to the white balance correction processing;
   a step of performing a setting of white balance correction processing on an image data; and
   a step of performing image processing on the synthesized image,
wherein each of the plurality of RAW images was obtained either (A) in an auto white balance mode in which the white balance mode is set automatically corresponding to a light source, or (B) in a manual white balance mode in which a user sets the white balance mode corresponding to the light source,
wherein at least one RAW image of the plurality of RAW images obtained in the photography operation corresponds to a white balance gain parameter which is different from a white balance gain parameter corresponding to another of the plurality of RAW images,
wherein the step of generating generates synthesized image data by synthesizing a plurality of RAW images subjected to the color matrix calculation, and
wherein, when image processing is performed on the synthesized image data, the white balance correction processing is performed using a white balance gain obtained by dividing a white balance gain corresponding to the setting of the white balance correction processing by a predetermined white balance gain.

* * * * *